US 8,285,223 B2

(12) United States Patent
Unger

(10) Patent No.: US 8,285,223 B2
(45) Date of Patent: Oct. 9, 2012

(54) WIRELESS LINK STATUS PRESENTATION FOR WIRELESS DISPLAYS

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 550 days.

(21) Appl. No.: 12/589,600

(22) Filed: Oct. 26, 2009

(65) Prior Publication Data
US 2010/0259682 A1   Oct. 14, 2010

Related U.S. Application Data

(60) Provisional application No. 61/138,881, filed on Dec. 18, 2008.

(51) Int. Cl.
*H04B 17/00* (2006.01)
(52) U.S. Cl. ............... 455/67.7; 455/566; 455/67.11; 455/67.14; 455/41.2; 348/180; 348/569; 348/570; 348/192; 348/732; 348/553; 348/559; 348/725; 725/72
(58) Field of Classification Search ............... 455/179.1, 455/67.11, 566, 67.7; 348/180, 569, 570, 348/192, 732, 553, 559, 725; 725/72
See application file for complete search history.

(56) References Cited

U.S. PATENT DOCUMENTS

| | | | |
|---|---|---|---|
| 6,580,452 B1 * | 6/2003 | Gangitano | 348/180 |
| 7,275,254 B1 * | 9/2007 | Jutzi | 725/72 |
| 7,286,190 B2 * | 10/2007 | Klopfenstein et al. | 348/569 |
| 7,436,459 B2 * | 10/2008 | Tanaka et al. | 348/570 |
| 7,509,666 B2 * | 3/2009 | Takagi et al. | 725/72 |
| 2007/0285439 A1 | 12/2007 | King et al. | |
| 2008/0074497 A1 * | 3/2008 | Kuh | 348/180 |

* cited by examiner

*Primary Examiner* — April G Gonzales
(74) *Attorney, Agent, or Firm* — Miller Patent Services; Jerry A. Miller

(57) ABSTRACT

A deviation from an expected wireless link status between a wireless display device and a local wireless media transmission device is detected via the wireless display device. The local wireless media transmission device is located proximate to the wireless display device. It is determined that an expected wireless signal is not incident upon a first wireless receiver of the wireless display device based upon the detected deviation from the expected wireless link status. A problem is identified that causes the detected deviation from the expected wireless link status. A wireless status indicator is displayed via the display. The wireless status indicator indicates that the expected wireless signal is not incident upon the first wireless receiver and indicates the identified problem that causes the detected deviation from the expected wireless link status. This abstract is not to be considered limiting, since other embodiments may deviate from the features described in this abstract.

37 Claims, 9 Drawing Sheets

WIRELESS LINK STATUS PRESENTATION FOR WIRELESS DISPLAYS

CROSS REFERENCE TO RELATED DOCUMENTS

This application claims priority benefit of U.S. Provisional Patent Application No. 61/138,881 filed Dec. 18, 2008 to Unger, which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Television and other display devices include display units that allow these devices to render visual content. Content is received and decoded by a tuner/decoder, such as from a broadcast, cable, or satellite system. Content may also be generated by a content playback device, such as a digital video disc (DVD) player. The tuner/decoder and content playback device may be located either within the same physical enclosure as the display device, or an external wired interconnection may be made to connect the display device to the respective other devices. Content is transmitted to the display device for viewing from the tuner/decoder or the content playback device either by use of circuit board or wired connections located within the physical enclosure, or by use of the external wired interconnection between the respective devices.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
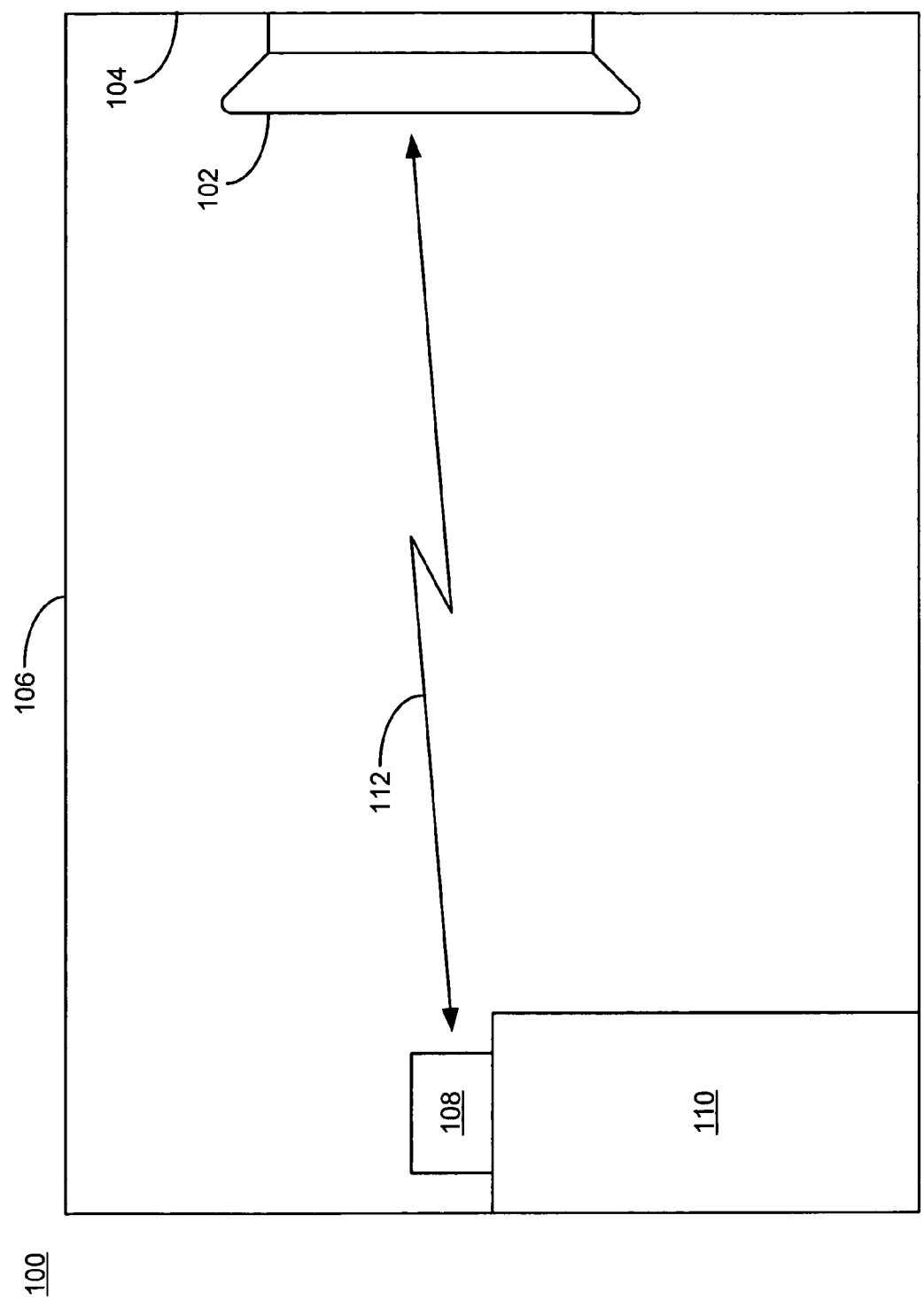
FIG. 1 is a diagram of an example of an implementation of a display device for wireless link status presentation for wireless displays consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "content" and "content selections" may include visual content, such as a motion picture, television program, or other content, is displayed within a display area of a display device. Such visual content may be from any conventional or unconventional source including, but not limited to broadcast, cable, Telco, Internet, satellite or other sources and may be detected, decoded and/or demultiplexed in any suitable manner to produce a television program viewing-like experience. Visual content may also be downloaded by the web access TV device via a global communications network, such as the Internet, by access to content servers. The terms "content" and "content selections" may also include audible content accessed via any of the above-referenced or additional sources.

The present subject matter provides wireless link status presentation for wireless displays. A wireless display device autonomously determines wireless link status for a wireless link to a local wireless media transmission device (hereinafter "local media box" or "media box" for brevity) to diagnose, troubleshoot, and instruct a user regarding obstructions, partial obstructions, and power-off issues for the local media box that may be affecting signal reception at the wireless display device. The wireless display device may, for example, be mounted to a wall in a room of a house or other structure. The local media box may be located on a shelf across the room, suspended from the ceiling, or otherwise supported to allow signaling via open-air space between the local media box and the wireless display device to be propagated between the respective devices. As such, local media boxes are located proximate to the wireless display device to allow content generated by the local media box to reach the wireless display device. Based upon the present subject matter, use of a wireless connection to pass content in a last hop to a display is monitored by a wireless display device, and the wireless display device provides troubleshooting capabilities.

Local media boxes may be configured to use directional frequencies, such as sixty gigahertz (60 GHz), for higher-bandwidth communications (e.g., uncompressed video transmission to the wireless display device). Lower frequency omni-directional signaling, such as two and four tenths gigahertz (2.4 GHz), may be used for control signaling generated by the local media box for control of the wireless display device and/or synchronization of higher-bandwidth communications. The wireless connection(s) may, for example, provide for a wireless emulation of a High Definition Multimedia Interface (HDMI), for which there is no current standard. Such a wireless connection may afford a user flexibility in placement of home entertainment components.

As discussed above, the wireless display device determines and presents wireless link status to a user via the wireless display device to guide the user toward correction of wireless signal problems for wireless signaling generated within the home or other structure. The determination of the wireless link status may be made by the wireless display device at power up of the wireless display device or upon a change in wireless link signal strength and/or connectivity. The wireless display device may use several techniques for determining a change in wireless link status. For example, expected signal strength, characteristics, or other signaling values may be configured and/or established for signal reception by the wireless display device.

For example, an expected energy level (e.g., raw power received) may be established and configured for signaling received from the local media box. Likewise, an expected signal to noise ratio (e.g., a modulated signal versus background noise) may be established and configured in either analog or digital signaling space. Similarly, an expected forward error correction level may be established and configured. As such, any of these or other criteria may be used by the wireless display device for evaluation of link status between the local media box and the wireless display device to evaluate a change or loss of link status, or a deviation from an expected value.

Where forward error correction is used to determine link status, if the expected value for forward error correction is that all bits are coming through without a need to correct any data bits, then a degradation in link status may be determined automatically by the wireless display device in response to a need to use forward error correcting bits to determine the actual data that was transmitted from the local media box. Additionally, where energy level is used to determine link status and the energy level received via a wireless directional 60 GHz signaling interface drops below an expected energy level value (e.g., threshold), then degradation in link status may be determined automatically by the wireless display device.

In any such situation, where an expected value is determined not to be received via a wireless link, the wireless display device may further identify that an obstruction and/or partial obstruction may be present or may have been placed between the local media box and the wireless display device. The wireless display device may also under certain circumstances determine that the local media box is turned off or is in a power-off state (e.g., when neither content nor control carrier is detected).

In response to a determination that the expected value of the wireless link status is not present at a receiver of the wireless display device, the wireless display device displays an indication of the wireless link status deviation from the expected value and an indication of the determined problem. The display of the indication of the wireless link status deviation and of the identified problem may be provided in a variety of ways without disturbing the paradigm of a local controlling media box and wireless display that displays content at the direction and control of the local controlling media box.

For example, an overlay of an indicator on display content may be made. The overlay may include an iconic image representative of the identified problem. As a further example, where the identified problem is an obstruction in the wireless signaling path, an iconic image of a hand may be displayed on top (e.g., over-layed) of a displayed image of a signal strength indicator to alert the user that an obstruction has been determined to be in the wireless signaling path.

Where the identified problem is a partial obstruction in the wireless signaling path, an iconic image of a hand may be displayed on top of a displayed image of a signal strength indicator and blinked periodically (e.g., displayed periodically and not displayed periodically in an iterative manner) to alert the user that a partial obstruction has been determined to be in the signaling path. In this manner, the wireless display device may display an indication of the deviation from the expected value in conjunction with displaying an indication of the identified problem. Other iconic images and display variations may be used to display a variety of information to the user without departure from the scope of the present subject matter. FIG. 6 through FIG. 9 described below show examples of overlay iconic images that may be used to represent different wireless status conditions. TABLE 1 below shows different conditions for display of wireless status and references FIG. 6 through FIG. 9 for certain wireless status conditions. Further, the wireless display device may audibly alert the user to the possible obstruction, partial obstruction, or other identified condition when audible alerts and/or a troubleshooting mode are configured.

The wireless display device may additionally or alternatively infer that either the local media box or the wireless display device were moved such that the wireless directional 60 GHz signal is no longer oriented directionally toward the wireless display device and display and alert the user to the possible signal incidence problem. The user may further be instructed to change the orientation of the local media box, for example, to reflect the directional 60 GHz signal off of a wall or ceiling to improve signal reception if an obstruction cannot be moved.

The wireless display device may also or alternatively infer or identify that the local media box is not active (e.g., turned off). Such a determination may be made, for example, by observing that no signaling is received via the lower-frequency omni-directional 2.4 GHz input. Where an absence of signal is determined by the wireless display device, troubleshooting instructions, such as an instruction to verify that the local media box is turned on and active may be presented to the user. Many other variations on determination of link status and status or instruction display by the wireless display device are possible and all are considered within the scope of the present subject matter.

Turning now to FIG. 1, FIG. 1 is a diagram of an example of an implementation of a system 100 for wireless link status presentation for wireless displays. A wireless display device 102 is shown mounted on a wall 104 within a room 106. It is understood that the room 106 may be a defined space within a house, office, or other structure and is presented generically for ease of illustration purposes. A local wireless media transmission device 108 (e.g., local media box 108) is positioned across the room 106 on a shelf 110. The local media box 108 transmits wirelessly via wireless signaling 112 to control and transmit video/visual and audio content to the wireless display device 102.

Figure 2:
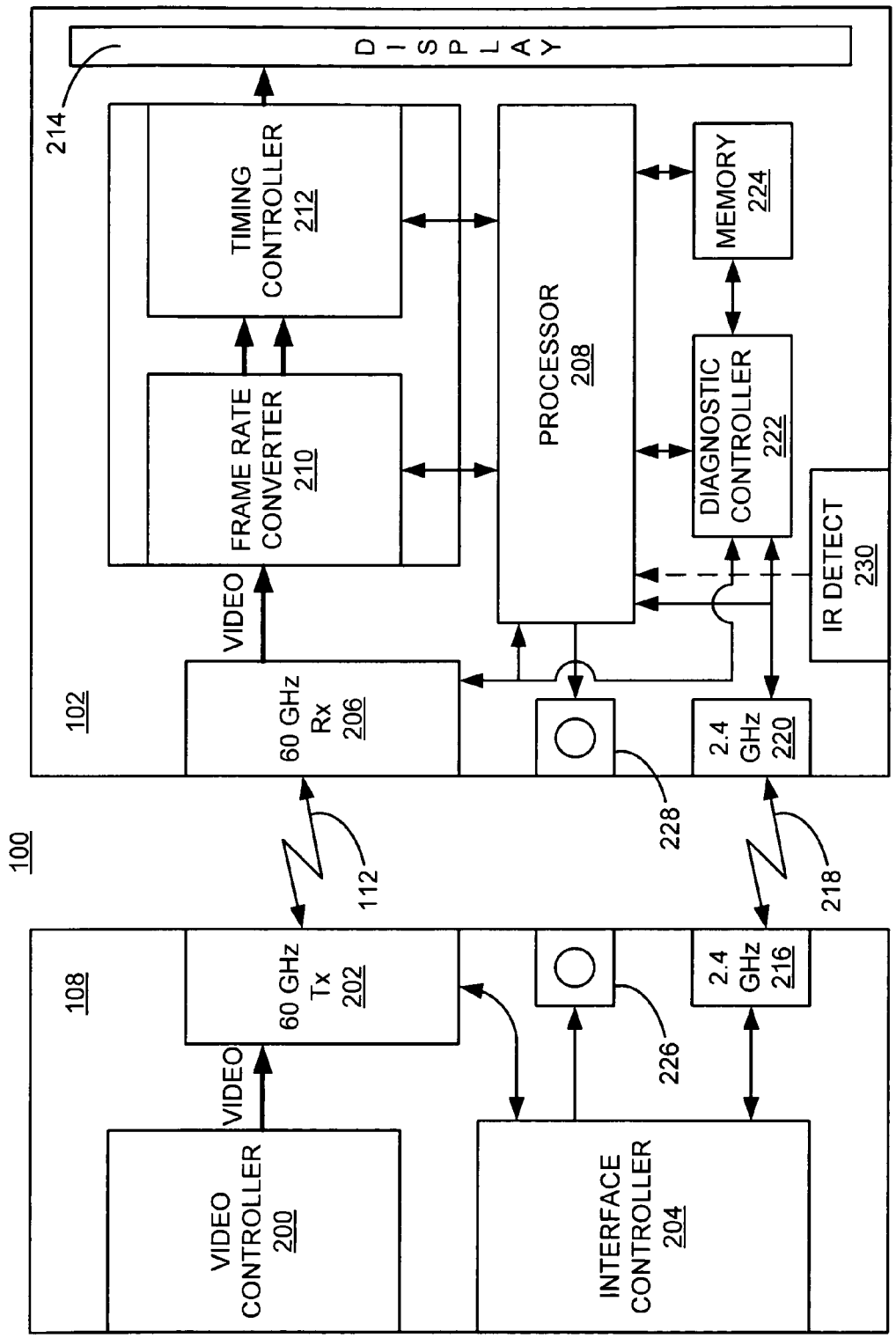
FIG. 2 is a block diagram of an example of an implementation of a system for wireless link status presentation for wireless displays consistent with certain embodiments of the present invention.

FIG. 2 is a block diagram of an example of an implementation of the system 100 for wireless link status presentation for wireless displays. Example components of the wireless display device 102 and the local media box 108 are depicted. The local media box 108 will be described in conjunction with the wireless display device 102 to further clarify the present example. However, it is understood that many other organizations of components and architectural implementations are possible for a given implementation and all are considered within the scope of the present subject matter.

The local media box 108 includes a video controller 200 that generates and sends video content to the wireless display device 102. While the present example denotes the use of video content, it is understood that audio content may be included without departure from the scope of the present subject matter. The video content is transmitted to the wireless display device 102 via the wireless signaling 112 within the present example via a sixty gigahertz (60 GHz) directional transmitter/receiver 202 under the control of an interface controller 204. A 60 GHz directional transmitter/receiver 206 receives the wireless signaling 112 and extracts the video content at the wireless display device 102 under control of a processor 208. It should be noted that certain connections are represented within FIG. 2 using dual-headed arrows. This representation is to suggest two-way signaling over the respective connections. However, this should not be considered limiting, as one-way or two-way connections may be used as appropriate for a given implementation, though it is understood that content flow would originate from the local media box 108 and be received by the wireless display device 102.

The processor 208 also controls a frame rate converter 210 for frame identification and processing of the received video content. The processor 208 additionally controls a timing controller 212 that provides timing control functionality with respect to the processed frames of the video content. Displays, such as those based upon liquid crystal display (LCD) technology, utilize a controller to convert the pixel data into the electronic pulses that effect the visual display. As such, the processor 208 may perform these and other control processing operations. As will be understood by a person of skill in the art based upon the present description, the timing controller 212 may be used to overlay iconic images and text, as described above and in more detail below for display of an indication of a deviation in an expected wireless link status and/or for display of an indication of an identified problem associated with the wireless link.

The received video content is supplied to a display 214 for output via any connection suitable for a given implementation. The display 214 may include any display technology capable of rendering content for viewing, such as a liquid crystal display (LCD), light-emitting diode (LED), cathode ray tube (CRT), projection, touchscreen, or other display element or panel.

Returning to the description of the interface controller 204, the interface controller 204 also provides control signaling to the wireless display device 102 via a two and four tenths gigahertz (2.4 GHz) omni-directional transmitter/receiver 216 and wireless signaling 218 (not shown in FIG. 1 for ease of illustration purposes). A 2.4 GHz omni-directional receiver 220 receives the control signaling from the local media box 108 within the wireless display device 102 and distributes the control signaling to the processor 208 and a diagnostic controller 222.

For purposes of the present description, the diagnostic controller 222 provides the wireless link status presentation for wireless displays associated with the present subject matter. A memory 224 provides storage for information associated with the wireless link status presentation for wireless displays and for general use within the wireless display device 102.

A light-emitting diode (LED) 226 is associated with the local media box 108 and is controlled by the interface controller 204. An LED 228 is associated with the wireless display device 102 and is controlled by the processor 208. The LED 226 and the LED 228 may be used to provide a power-on indication from the respective device, and may also be used to provide signaling associated with certain conditions (e.g., blinking to provide status associated with certain conditions).

An infra-red (IR) detection device 230 provides reception and interpretation of user inputs made via an IR remote control device (not shown). The IR detection device 230 provides signaling to the processor 208 for user input processing. Though not depicted within FIG. 2 for ease of illustration purposes, it is understood that the 2.4 GHz omni-directional transmitter/receiver 216 and the 2.4 GHz omni-directional receiver 220 may also receive signaling from a radio frequency (RF) remote control device (not shown) to allow user input to either the local media box 108 or the wireless display device 102, respectively, via RF wireless signaling. Accordingly, a user of the system 100 may interact with the respective devices by more than one interactive control device.

It is understood that the interface controller 204, the processor 208, and the diagnostic controller 222 provide computer instruction execution, computation, and other capabilities within the respective devices. As described above, the memory 224 stores information, such as a configuration and other information, associated with wireless link status presentation for wireless displays. It is understood that the memory 224 may include any combination of volatile and non-volatile memory suitable for the intended purpose, distributed or localized as appropriate for a given implementation, and may include other memory segments not illustrated within the present example for ease of illustration purposes. For example, the memory 224 may include a code storage area, a code execution area, and a data area without departure from the scope of the present subject matter. It is further understood that the local media box 108 may include a similar memory without departure from the scope of the present subject matter.

It should be noted that the diagnostic controller 222 is illustrated as a component-level module for ease of illustration and description purposes. It is also understood that the diagnostic controller 222 includes any hardware, programmed processor(s), and memory used to carry out the respective functions of the diagnostic controller 222 as described above and in more detail below. For example, the diagnostic controller 222 may include additional controller circuitry in the form of application specific integrated circuits (ASICs), processors, and/or discrete integrated circuits and components for performing electrical control activities associated with the diagnostic controller 222. Additionally, the diagnostic controller 222 may also include interrupt-level, stack-level, and application-level modules as appropriate. Furthermore, the diagnostic controller 222 may include any memory components used for storage, execution, and data processing by these modules for performing processing activities associated with the diagnostic controller 222. The diagnostic controller 222 may also form a portion of other circuitry described without departure from the scope of the present subject matter.

It should also be noted that the diagnostic controller 222 may alternatively be implemented as an application stored within the memory 224. In such an implementation, the diagnostic controller 222 may include instructions executed by the processor 208 for performing the functionality described herein. The processor 208 may execute these instructions to provide the processing capabilities described above and in more detail below for the wireless display device 102. The diagnostic controller 222 may form a portion of an interrupt service routine (ISR), a portion of an operating system, a portion of a browser application, or a portion of a separate application without departure from the scope of the present subject matter.

While the local media box 108 and the wireless display device 102 are illustrated with and have certain components described, other modules and components may be associated with the respective devices. For example, devices, such as timers and audio outputs, may be incorporated within a given implementation of the local media box 108 or the wireless display device 102, as suitable for the given implementation. As such, these and other such devices may be associated with either the local media box 108 or the wireless display device 102 without departure from the scope of the present subject matter. Accordingly, the local media box 108 and the wireless display device 102 may take many forms.

Figure 3:
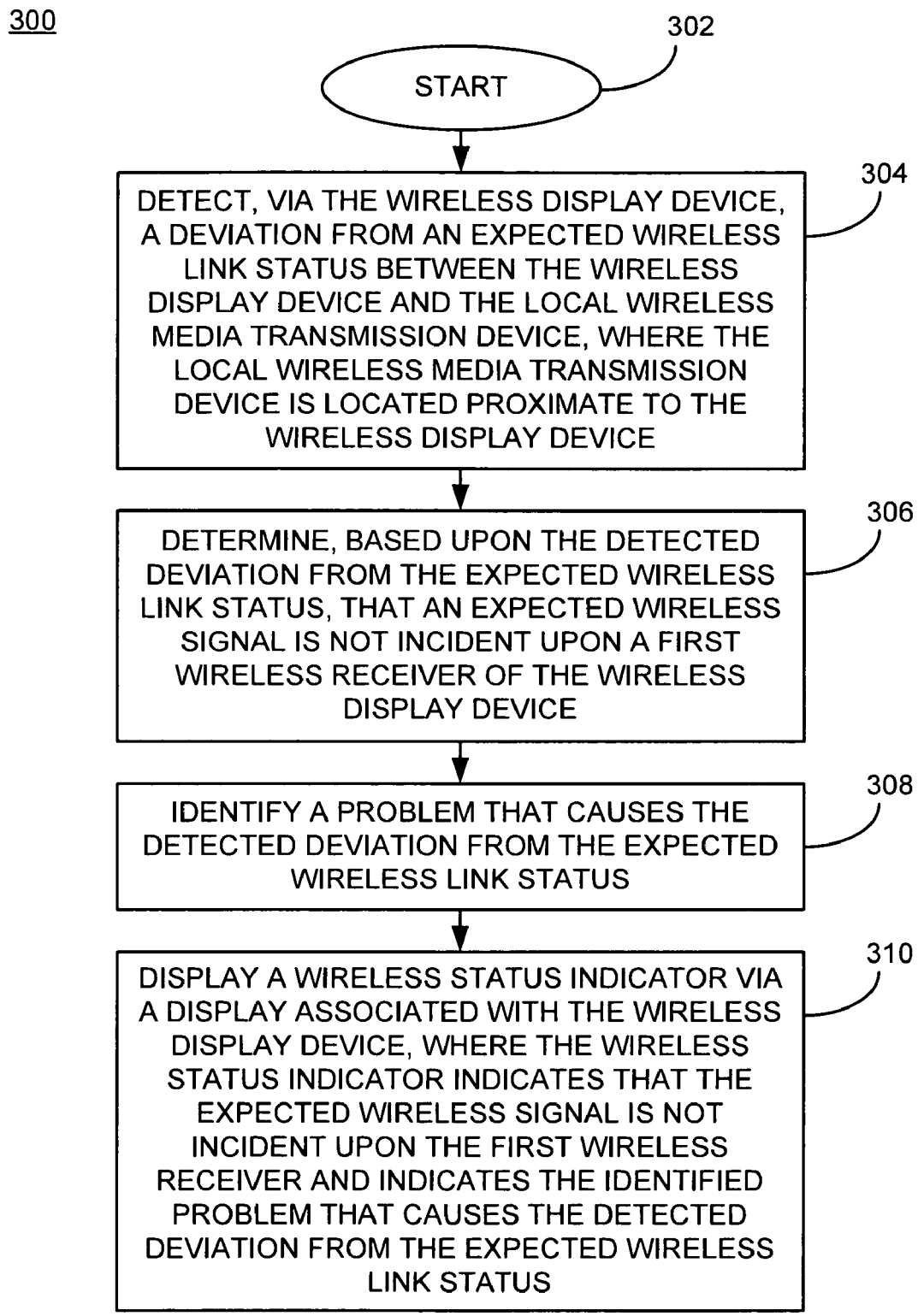
FIG. 3 is a flow chart of an example of an implementation of a process for automated control of wireless link status presentation for wireless displays consistent with certain embodiments of the present invention.
Figure 4A:
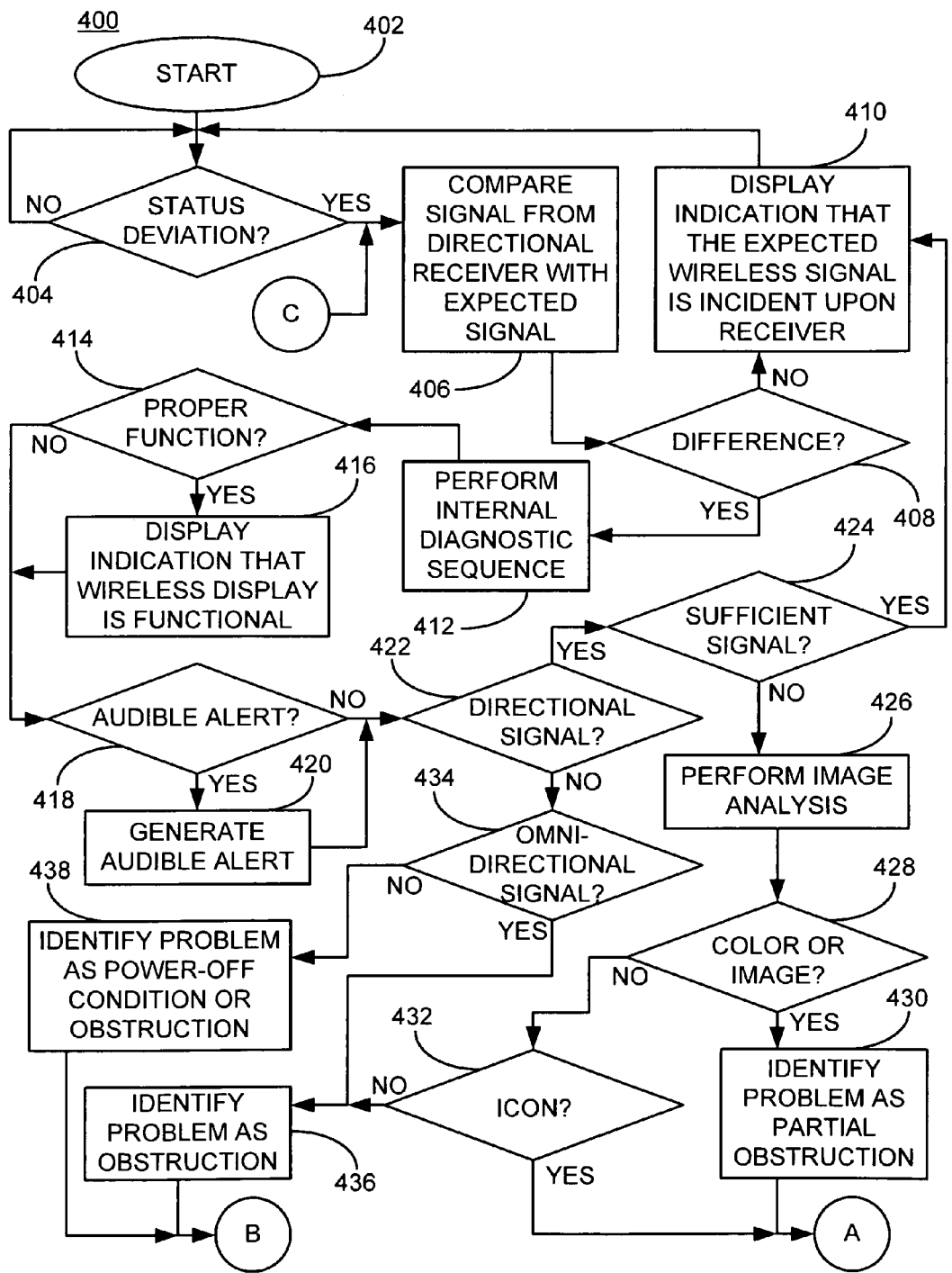
FIG. 4A is a flow chart of initial processing of an example of an implementation of a process for wireless link status presentation for wireless displays including processing for diagnostics and for identifying problems that cause signaling reception problems consistent with certain embodiments of the present invention.
Figure 4B:
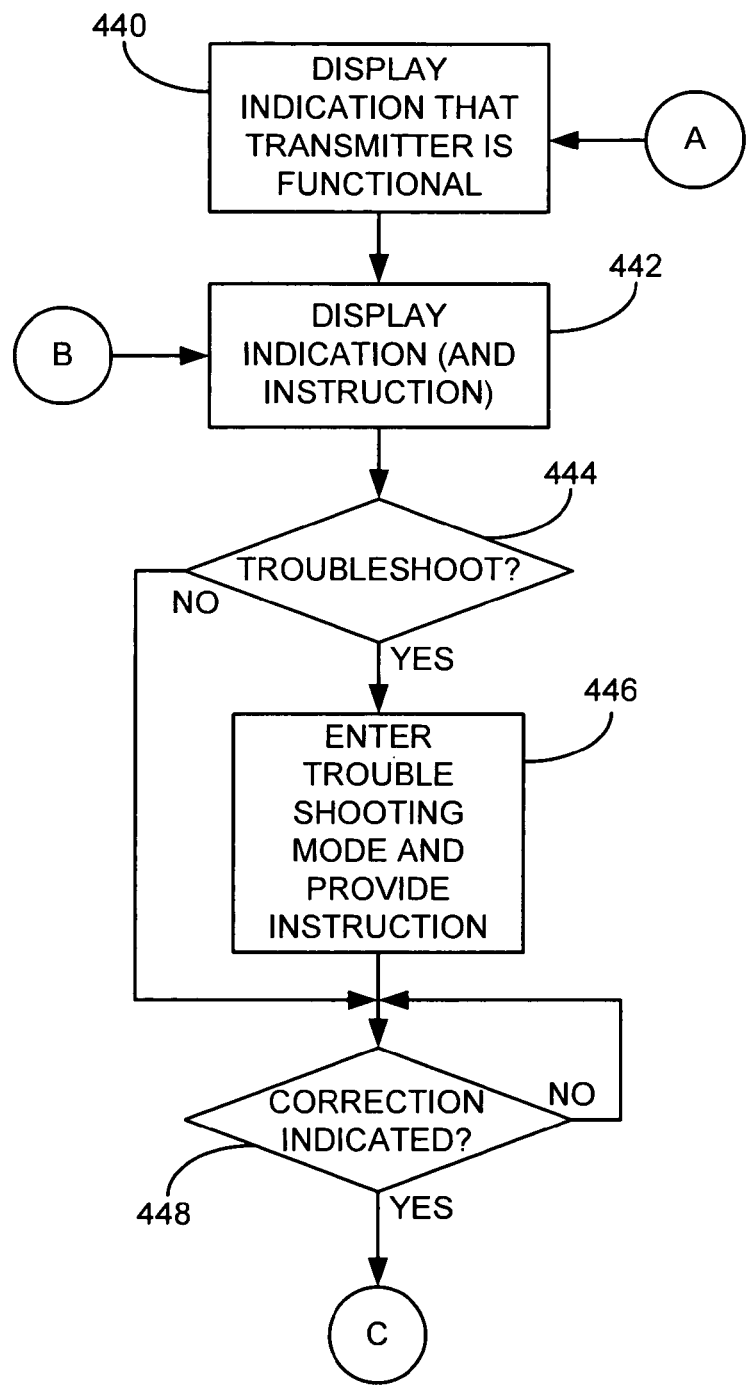
FIG. 4B is a flow chart of a second portion of an example of an implementation of a process for wireless link status presentation for wireless displays including processing for diagnostics and for identifying problems that cause signaling reception problems consistent with certain embodiments of the present invention.

FIG. 3 through FIG. 4B described below provide example processes that may be executed by devices, such as the wireless display device 102, to perform the wireless link status presentation for wireless displays described herein. Many other variations on the example processes are possible and all are considered within the scope of the present subject matter. The example processes may be performed by modules, such as the diagnostic controller 222 and/or executed by the processor 208. Display of wireless link status for presentation to the user may be made via the display 214 under control of the diagnostic controller 222 and/or the processor 208. It should be noted that time out procedures and other error control procedures are not illustrated within the example processes described below for ease of illustration purposes. However, it is understood that all such procedures are considered to be within the scope of the present subject matter. Further, certain portions of the processes described below indicate that certain input requests are detected via an input device generally for ease of illustration purposes. However, it is understood that any such detection of an input request may be detected via an input interface component, such as the 2.4 GHz omni-directional receiver 220.

FIG. 3 is a flow chart of an example of an implementation of a process 300 for automated control of wireless link status presentation for wireless displays. The process 300 begins at 302. At block 304, the process 300 detects, via the wireless display device, a deviation from an expected wireless link status between the wireless display device and the local wireless media transmission device, where the local wireless media transmission device is located proximate to the wireless display device. At block 306, the process 300 determines, based upon the detected deviation from the expected wireless link status, that an expected wireless signal is not incident upon a first wireless receiver of the wireless display device. At block 308, the process 300 identifies a problem that causes the detected deviation from the expected wireless link status. At block 310, the process 300 displays a wireless status indicator via a display associated with the wireless display device, where the wireless status indicator indicates that the expected wireless signal is not incident upon the first wireless receiver and indicates the identified problem that causes the detected deviation from the expected wireless link status.

FIGS. 4A-4B illustrate a flow chart of an example of an implementation of a process 400 for wireless link status presentation for wireless displays including processing for diagnostics and for identifying problems that cause signaling reception problems according to the present subject matter. FIG. 4A illustrates initial processing within the process 400. The process 400 begins at 402. At decision point 404, the process 400 determines whether a deviation from an expected wireless link status between a wireless display device, such as the wireless display device 102, and a local wireless media transmission device, such as the local media box 108, has been detected. For purposes of the present example, a deviation from an expected wireless link status may be determined during a power-up cycle for the wireless display device 102, during a periodic diagnostic processing activity, in response to detection of a loss or degradation of signaling received from the local media box 108, long-term signal characteristic statistics, or during any other event that provides information useable to determine that a deviation from an expected wireless link status has been detected.

To provide a more detailed example of determining whether a deviation from an expected wireless link status between a wireless display device has been detected, signal strength degradation coupled with or in addition to an inability to extract a digital data stream may be considered deviations from expected wireless link status. Either analog or digital signal characteristics may be used to make such a determination.

For analog signal characteristics, a known or anticipated signal to noise ratio may be measured and configured as an aspect of an expected wireless link status. In such an implementation, a drop or absence of signal level sufficient to cause a measureable percentage difference in the expected signal to noise ration may be used to determine that a deviation has occurred. While not considered limiting, any suitable measureable difference may be used, such as five percent (5%), ten percent (10%), or other measureable percentage.

Alternatively, digital signal characteristics, error correction may be implemented, measured, and configured as an aspect of an expected wireless link status. In such an implementation, a threshold for a known or anticipated correction level may be measured and configured. Where the anticipated error correction is that signaling is of sufficient quality that no error correction is needed, a need to use error correcting codes to identify transmitted data may signify a measureable deviation from an expected wireless link status. Further, if a threshold of signal quality deteriorates or is not present to an extent that error correction is not possible based upon a number of configured error correction bits, this result may signify a measureable deviation from an expected wireless link status.

It should be understood that system design activities to build in head room to allow for the performance deviation between the laboratory/development conditions and real-world conditions of deployment, either for analog or digital signaling characteristics such as a noise floor or number of error correcting bits, respectively, may be used as suitable for a given implementation to allow detection of deviations in wireless link status for a wireless link between a wireless display device and a local media box. Many other examples of signaling characteristics for implementing detection of deviations in expected wireless link status are possible and all are considered within the scope of the present subject matter. It is also understood that the local media box 108 is located proximate to the wireless display device 102, such as across a room as illustrated and described in association with FIG. 1, within the present example.

Returning to the description of FIG. 1, when a determination is made that a meaningful/measureable deviation from the expected wireless link status has been detected, the process 400 compares a signal received from the directional wireless receiver, such as the 60 GHz directional transmitter/receiver 206, with the expected wireless signal at block 406. At decision point 408, the process 400 makes a determination as to whether a significant difference has been identified between the actual received wireless signal and the expected wireless signal. When a determination is made that there is no meaningful/measureable difference identified between the actual received wireless signal and the expected wireless signal, the process 400 displays an indication that the expected wireless signal is incident upon the directional wireless receiver at block 410.

It is understood that transient interruptions in received signaling may occur with wireless devices. Accordingly, display of the indication that the expected wireless signal is incident upon the directional wireless receiver at block 410 may be used to identify such a transient interruption for a user of the wireless display device 102 while also indicating that the expected wireless signal is again present at the directional wireless receiver. For iterative processing, as described in more detail below, where a user is instructed to take remedial actions to remove obstacles or perform other actions, display of the indication that the expected wireless signal is incident upon the directional wireless receiver at block 410 may be used to provide feedback to the user that the user's actions have improved signal reception.

It should also be noted that display of any indications described herein may be performed by directing the timing controller 212 to overlay graphical or textual indications at a specified location on the display 214. The graphical or textual indications may be stored, for example, within the memory 224. These graphical or textual indications may be stored as static images within the memory 224 and may be gated/rendered to overlay any portion of a viewable display area. Variations between a selected static image and a display rate may be used to convey status for the wireless link between the local media box 108 and the wireless display device 102. It is also understood that a person of skill in the art will understand, based upon the present description, how to utilize a timing controller, such as the timing controller 212, to overlay text or graphics onto an image displayed via a display, such as the display 214. As such, details of this processing are omitted herein for brevity.

When a determination is made that a difference has been identified between the actual received wireless signal and the expected wireless signal at decision point 408, the process 400 automatically performs an internal diagnostic sequence at block 412. At decision point 414, the process 400 makes a determination as to whether the wireless display device 102 is functioning properly. When a determination is made that the wireless display device 102 has passed the internal diagnostic sequence and that the wireless display device 102 is functioning properly, the process 400 displays an indication that the wireless display device 102 is functioning properly at block 416.

When a determination is made that the wireless display device 102 has not passed the internal diagnostic sequence and that the wireless display device 102 is not functioning properly, or upon displaying the indication that the wireless display device 102 is functioning properly at block 416, the process 400 makes a determination as to whether an audible alert is configured for the wireless display device 102 at decision point 418. An audible alert may be configured, for example, via user interaction with a configuration menu of the wireless display device 102. The configuration may be stored, for example, within the memory 224.

When a determination is made that an audible alert is configured for the wireless display device 102, the process 400 generates an audible indication via an audio output device (not shown) to indicate status at block 420. For example, when the internal diagnostic sequence passes, an audible indication may be generated via the audio output device indicating that the internal diagnostic sequence has passed for the wireless display device 102. Alternatively, when the internal diagnostic sequence does not pass, an audible indication may be generated via the audio output device indicating that the internal diagnostic sequence has not passed for the wireless display device 102 at block 420. As described in more detail below, the process 400 may also generate an audible indication via the audio output device to indicate that the expected wireless signal is not incident upon the directional wireless receiver based upon the difference determined at decision point 408.

Upon completion of generation of the audible alert at block 420 or upon determining that an audible alert is not configured for the wireless display device 102 at decision point 418, the process 400 determines, based upon the detected deviation from the expected wireless link status, whether the expected wireless signal is incident upon the directional wireless receiver of the wireless display device 102 at decision point 422. For example, the process 400 may make a determination that there is an absence of the expected wireless signal at the directional wireless receiver. Processing for a situation where there is an absence of the expected wireless signal at the directional wireless receiver will be described in more detail below after a description of processing for a determination that there is a signal present at the directional wireless receiver.

When a determination is made that a signal is present at the directional wireless receiver, the process 400 makes a determination at decision point 424 as to whether there is sufficient signal incident upon the directional wireless receiver for processing. For example, the process 400 may make a determination, based upon the detected deviation from the expected wireless link status and the determination that the directional wireless signal is incident upon the directional wireless receiver, that a sufficient or an insufficient wireless signal is present at the directional wireless receiver.

When a determination is made that a sufficient signal is present at the directional wireless receiver at decision point 424, the process 400 returns to block 410 and displays an indication that a sufficient wireless signal is incident upon the directional wireless receiver. The process 400 may also indicate that the signal quality or magnitude is less than expected and may further provide instructions to the user via the display 214 to make certain that all obstacles are out of the air space between the local media box 108 and the wireless display device 102.

Returning to the description of decision point 424, when a determination is made that a sufficient signal is not present at the directional wireless receiver, such as a determination that a signal of quality lower than the expected wireless signal is incident upon the directional wireless receiver, the process 400 performs an image analysis of video content within the lower-quality signal at block 426. As described in more detail below, the process 400 may then determine, based upon the image analysis of the video content, whether the local media box 108 is providing useable video content.

As such, at decision point 428, the process 400 makes a determination as to whether a solid color or a static image is present within the analyzed video content. In this manner, the process 400 may identify a static display image generated by the local media box 108 in response to the performed image analysis of the video content within the lower-quality signal. When a determination is made that a solid color or a static image is present within the analyzed video content, the process 400 determines, at block 430, that the local media box is functional and identifies that a partial obstruction placed between the local media box 108 and the wireless display device 102 causes the lower-quality signal in conjunction with the static display image generated by the local media box 108 being present within the lower-quality signal incident upon the directional wireless receiver. Displayed information and subsequent processing for the process 400 are described in association with FIG. 4B below. Additional description of FIG. 4A will be provided prior to the description of FIG. 4B.

Returning to the description of decision point 428, when a determination is made that a solid color or a static image are not present within the analyzed video content, the process 400 makes a determination at decision point 432 as to whether a static iconic display image is present within the lower-quality signal received via the directional wireless receiver. In this manner, the process 400 may identify a static iconic display image generated by the local media box 108 in response to the performed image analysis of the video content within the lower-quality signal. The process 400 may further determine that the static iconic display image is a logo associated with the local media box 108. When a determination is made that a static iconic display image is present within the lower-quality signal received via the directional wireless receiver, the process 400 determines that the local wireless box 108 is functional and identifies that active video content is not presently being received by the directional wireless receiver. Displayed information and subsequent processing for the process 400 are described in association with FIG. 4B below. Additional description of FIG. 4A will be provided prior to the description of FIG. 4B.

Returning to the description of decision point 422, when a determination is made that the expected wireless signal is not incident upon the directional wireless receiver, the process 400 makes a determination at decision point 434 as to whether signaling transmitted from the local media box 108 via an omni-directional wireless receiver tuned to an omni-directional frequency is incident upon an omni-directional wireless receiver, such as the 2.4 GHz receiver 220.

When a determination is made at decision point 434 that signaling transmitted from the local media box 108 is incident upon the omni-directional wireless receiver, or upon determining at decision point 432 that a static iconic display image is not present within the lower-quality signal received via the directional wireless receiver, the process 400 identifies at block 436 that an obstruction placed between the local media box 108 and the wireless display device 102 causes the absence of the expected wireless signal at the directional wireless receiver in conjunction with detection of the signaling transmitted from the local media box 108 received via the omni-directional wireless receiver. Displayed information and subsequent processing for the process 400 are described in association with FIG. 4B below. Additional description of FIG. 4A will be provided prior to the description of FIG. 4B.

Returning to the description of decision point 434, when a determination is made that signaling transmitted from the local media box 108 is not incident upon the omni-directional wireless receiver, the process 400 identifies that a power-off condition at the local media box 108 or an obstruction causes the absence of the expected wireless signal at the directional wireless receiver of the wireless display device 102 at block 438. Displayed information and subsequent processing for the process 400 are described in association with FIG. 4B below.

FIG. 4B illustrates a second portion of an example of an implementation of the process 400 for wireless link status presentation for wireless displays. In response to either identifying the problem as a partial obstruction at block 430 or upon determining that a static iconic display image is present within the lower-quality signal received via the directional wireless receiver at decision point 432 (see FIG. 4A), the process 400 displays an indication that the local media box 108 is functional at block 440.

Upon completion of displaying the indication that the local media box 108 is functional at block 440, or upon either identifying the problem as an obstruction at block 436 or identifying the problem as a power-off condition or obstruction at block 438, the process 400 displays an indication of the respective condition and any associated instruction(s) directing a user to correct the identified problem at block 442. For example, the process 400 may display an indication that an obstruction is located between the local media box 108 and the wireless display device 102 and display an instruction directing the user to move the obstruction.

Alternatively, the process 400 may display an instruction directing the user to move the local media box 108 to reflect the transmitted signal generated by the local media box 108 off of a ceiling and/or a wall of a room within which the local media box 108 and the wireless display device 102 are located to avoid the obstacle with the directional 60 GHz signal. Further, the process 400 may display an indication of the absence of the expected wireless signal at the directional wireless receiver and an indication that the power-off condition at the local media box 108 causes the absence of the expected wireless signal at the directional wireless receiver. It should further be noted that, based upon the processing described above, multiple problems with signal reception may be identified that cause the detected deviation from the expected wireless link status. As such, an instruction directing the user to correct one or more of the identified multiple problems may be displayed.

At decision point 444, the process 400 makes a determination as to whether a request has been detected, such as via an input device associated with the wireless display device 102, to enter a troubleshooting mode for the wireless display device 102. When a determination is made that a request has been detected to enter a troubleshooting mode for the wireless display device 102, the process 400 enters a troubleshooting mode for the wireless display device 102 and provides instructions to the user via an output device for troubleshooting the problem that causes the detected deviation from the expected wireless link status at block 446. The instructions may be output, for example, via an audio output (not shown) or displayed via the display 214.

Upon outputting the instructions or upon determining that a request to enter the troubleshooting mode has not been detected, the process 400 makes a determination at decision point 448 as to whether an indication has been detected, such as via an input device associated with the wireless display device 102, that the user has corrected at least one of the identified problems. When a determination is made that an indication has been detected that the user has corrected at least one of the identified problems, the process 400 returns to continue processing as described in association with FIG. 4A above beginning at block 406 to compare the signal received via the directional receiver with the expected signal. The process 400 may iterate as described above until all signal problems have been corrected.

As such, when the process 400 determines that the expected wireless signal is not incident upon the directional wireless receiver by any of the various processing paths described above, the process 400 may identify additional or select other problems for correction, such as via the troubleshooting mode and processing associated with decision point 444 and block 446 (See FIG. 4B) to display an instruction directing the user to correct a second or subsequent identified problem. The process 400 may continue to receive indications that the user has corrected the identified problems at decision point 448 and continue comparing the received signaling with the expected signaling, as described above. When the process 400 determines that the expected wireless signal is incident upon the directional wireless receiver and that no difference from the expected signal is identified at decision point 408, the process 400 may display the indication at block 410 that the expected wireless signal is incident upon the directional wireless receiver and return to decision point 404 to await a determination that a deviation from the expected wireless link status has been detected.

As such, the process 400 detects deviations from expected signaling and displays indications of the detected deviations. The process 400 diagnoses internal processing to eliminate concerns of problems associated with the wireless display device 102. The process 400 analyzes signaling or an absence of signaling received from the local media box 108 and identifies several different problems that may cause the detected deviation from the expected signaling reception. The process 400 provides a troubleshooting mode to facilitate resolution of identified problems via interaction with a user of the wireless display device 102 and displays status and instructions for the user as the identified problems are corrected. Many other variations on the processing described are possible. Accordingly, all such variations in processing are considered within the scope of the present subject matter.

It should further be understood that, though not depicted within the example processes for ease of illustration purposes, the wireless display device 102 (and the local media box 108) may be configured to transition to a low power state to listen for receipt of signaling and/or content when the other respective device is turned off. As such, when signaling and/or content is not received from the local media box 108 and the wireless display device 102 identifies that it is likely that the local media box 108 is turned off, the wireless display device 102 may enter a low-power listening state to wait for signaling from the local media box 108 prior to re-energizing circuitry for processing certain signaling in associated with the present subject matter.

Figure 5:
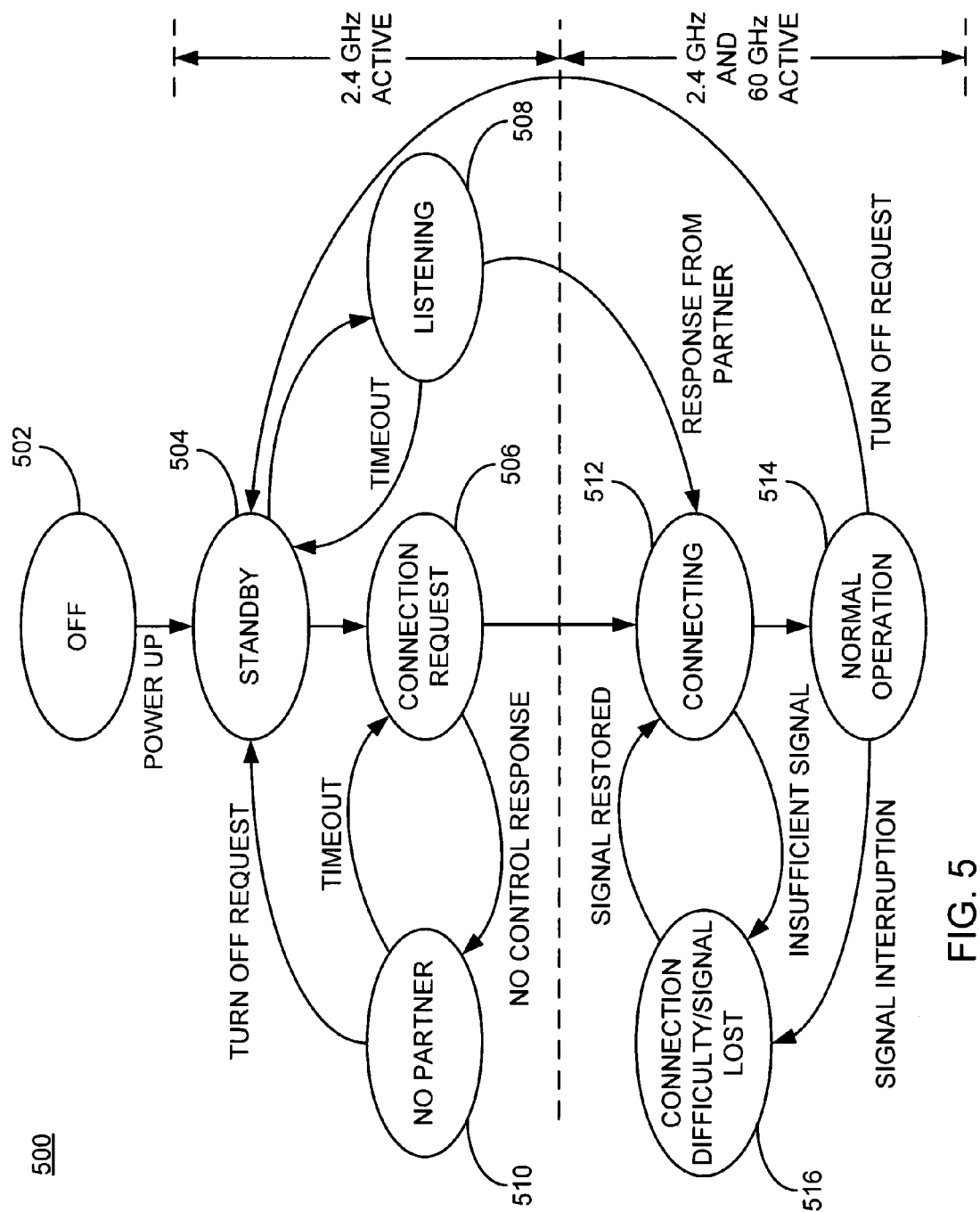
FIG. 5 is a diagram of an example of an implementation of a state machine executable by a wireless display device for wireless link status presentation for wireless displays consistent with certain embodiments of the present invention.

FIG. 5 is a diagram of an example of an implementation of a state machine 500 executable by a wireless display device, such as the wireless display device 102, for wireless link status presentation for wireless displays. An initial "OFF" state 502 may transition to a "STANDBY" state 504 in response to a power up condition. Based upon a configured power-up mode for the wireless display device 102, the state machine 500 may transition to either a "CONNECTION REQUEST" state 506 to begin attempting to establish a connection with the local media box 108 or may transition to a "LISTENING" state 508 to await receipt of signaling from the local media box 108 to establish a connection.

Regarding the "LISTENING" state 508, if no signaling is received from the local media box 108 to establish a connection after a configured time period, the state machine 500 may transition to the "STANDBY" state 504 and iteratively return to ether the "CONNECTION REQUEST" state 506 to attempt to establish a connection with the local media box 108 or to the "LISTENING" state 508 to await receipt of signaling from the local media box 108 to establish a connection.

Regarding the "CONNECTION REQUEST" state 506, if no control response is received from the local media box 108, for example after a configured time period or after a configured number of attempts to connect from this state, the state machine 500 may transition to a "NO PARTNER" state 510. After a configured timeout period, the state machine 500 may transition back to the "CONNECTION REQUEST" state 506 to attempt to establish a connection with the local media box 108. If a turn off request is received while in the "NO PARTNER" state 510, the state machine 500 may return to the "STANDBY" state 504 to begin a power down sequence (not shown).

For purposes of the present example, it should be noted that all communications used by the wireless display device 102 and the local media box 108 for the above-described states of processing may be performed via an active 2.4 GHz omni-directional communication device, such as the 2.4 GHz omni-directional transmitter/receiver 216. Subsequently-described communications may be performed using a combination of an active 2.4 GHz omni-directional device and a 60 GHz directional communication device, such as the 60 GHz directional transmitter/receiver 206, as appropriate for a given implementation. However, it is understood that variations on the present example are possible and all are considered within the scope of the present subject matter.

Returning to the description of the state machine 500, in response to signaling received from the local media box 108 in response to an attempt to establish a connection with the local media box 108 from the "CONNECTION REQUEST" state 506, or in response to receipt of signaling from the local media box 108 (e.g., "Response from Partner" in FIG. 5) to establish a connection in the "LISTENING" state 508, the state machine 500 may transition to a "CONNECTING" state 512. After connection operations are completed, the state machine 500 may transition to a "NORMAL OPERATION" state 514 and video content is displayed via a display, such as the display 214.

Upon the occurrence of a signal interruption, for example due to an obstruction being placed within the 60 GHz signaling path, the state machine 500 may transition to a "CONNECTION DIFFICULTY/SIGNAL LOST" state 516. Processing may begin, as described above, to diagnose and identify a problem that causes a connection difficulty and/or a signaling loss. If signaling is restored, the state machine 500 may transition back to the "CONNECTING" state 512. If insufficient signaling is identified again prior to transition to the "NORMAL OPERATION" state 514, the state machine 500 may transition back to the "CONNECTION DIFFICULTY/SIGNAL LOST" state 516. When signaling is ultimately restored, the state machine 500 may transition back to the "NORMAL OPERATION" state 514 and operate normally until a turn off request is received and the state machine transitions back to the "STANDBY" state 504 to begin a power down sequence (not shown).

As such, the state machine 500 shows an example sequence of states that may be used within a processing device associated with the wireless display device 102 to control power up, signaling establishment, signaling difficulties, and power-down sequencing. Many other variations on the example state machine 500 are possible and all are considered within the scope of the present subject matter.

In certain implementations, the wireless status indicator may be displayed using icons that are familiar and intuitively understood by non-technical users such as those shown in FIG. 6 through FIG. 9. As described above, these wireless status indicators may be displayed as an overlay on display content, for example, via use of the timing controller 212. The overlay display may include one or more iconic images representative of the expected wireless signal not being incident upon the first wireless receiver and representative of the identified problem.

The following TABLE 1 depicts several of the states described above in association with the state machine 500 of FIG. 5. TABLE 1 also maps certain of those states to example representations of icons illustrated within FIG. 6 through FIG. 9. It is understood that many variations on the example icons and mapping to states of a state machine are possible and all are considered within the scope of the present subject matter.

TABLE 1

Connection State Indication Example

Figure 6:
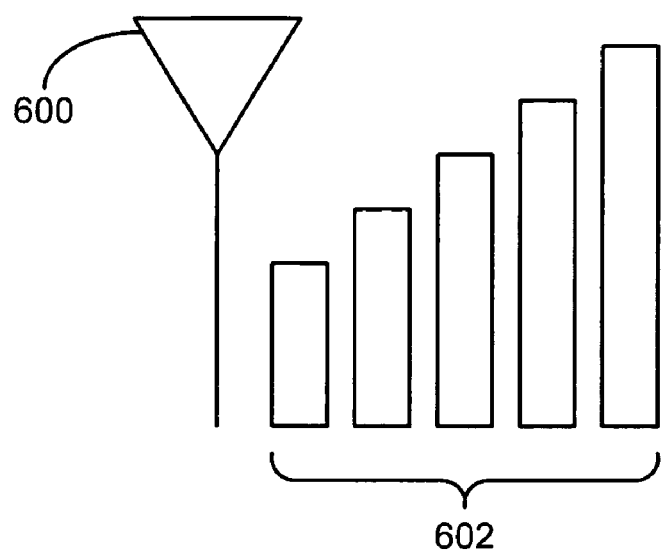
FIG. 6 is a drawing of an example of an implementation of a visual icon pair for wireless link status presentation for wireless displays consistent with certain embodiments of the present invention.
Figure 7:
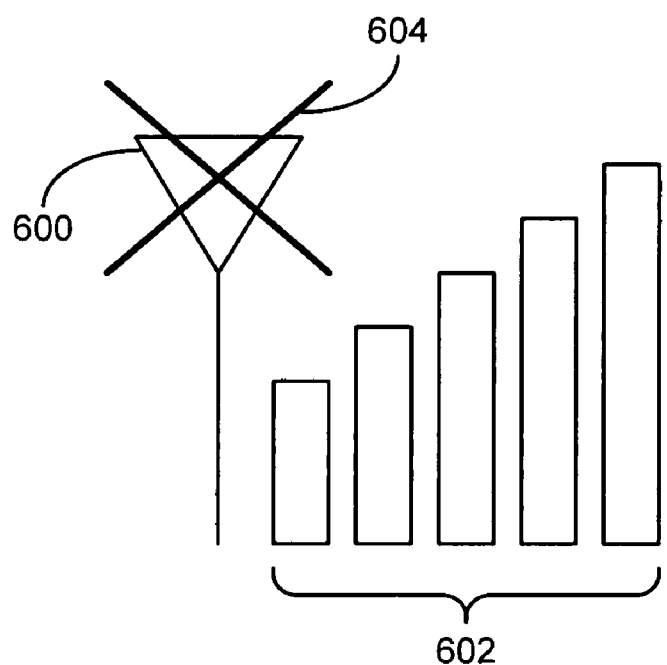
FIG. 7 is a drawing of an example of an implementation of the visual icon pair of FIG. 6 modified to represent that no signaling is being received from a partner local wireless media transmission device consistent with certain embodiments of the present invention.
Figure 8:
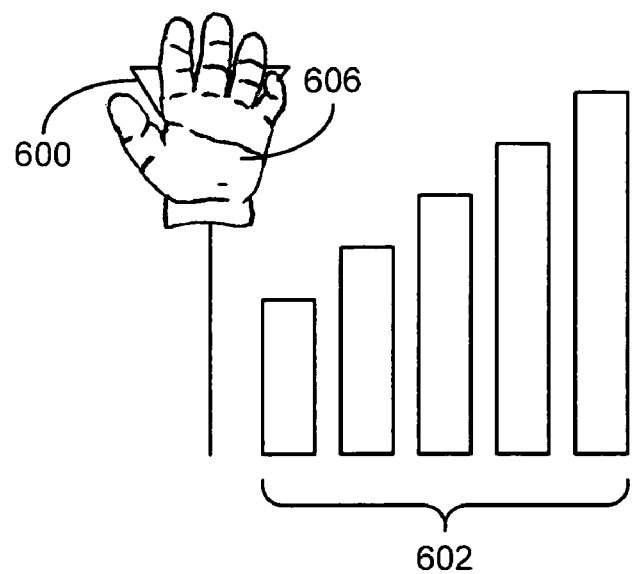
FIG. 8 is a drawing of an example of an implementation of the visual icon pair of FIG. 6 modified to represent that a connection difficulty or lost signaling has been identified by a wireless display device consistent with certain embodiments of the present invention.
Figure 9:
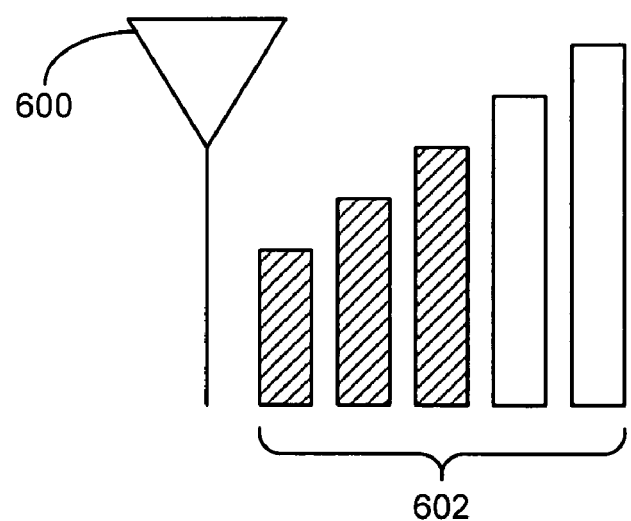
FIG. 9 is a drawing of an example of an implementation of the visual icon pair of FIG. 6 modified to represent that a wireless display device is connecting with the local wireless media transmission device consistent with certain embodiments of the present invention.

| STATE | LED INDICATION | SCREEN INDICATION | MEANING |
|---|---|---|---|
| Off | Off | N/A | "green" switch is off (same as unplugged) |
| Standby | Very slow orange blink | See FIG. 6 | Low power controller wakes periodically listening for connection request |
| Connection Request | Orange blink | See FIG. 6 | Waiting for box/panel to respond to connection request |
| No Partner | Solid red | See FIG. 7 | No box/panel responding to connection request (powered off?) |
| Connection Difficulty/ Signal Lost | Red blink | See FIG. 8 | No box/panel responding to connection request (powered off?) or Blocked or insufficient signal to transfer video |
| Connecting | Green blink | See FIG. 9 | No box/panel responding to connection request (powered off?) |
| Operating Normally | Solid green | N/A | Self explanatory |

FIG. 6 is a drawing of an example of an implementation of a visual icon pair for wireless link status presentation for wireless displays. An antenna icon 600 represents antenna and communication activity. A signal strength icon array 602 represents signal strength as received by the wireless display device 102. Changes in display characteristics of the antenna icon 600 may be used to notify a user of a state of processing for the wireless display device 102. Changes to display characteristics of the signal strength icon array 602 may be used to notify a user of changes to the received signal strength at the wireless display device 102. In combination, the antenna icon 600 and the signal strength icon array 602 provide a flexible range of information display capabilities for the wireless display device 102.

Regarding changes to display characteristics for the antenna icon 600, as noted within TABLE 1 above, for the "STANDBY" state 504 of FIG. 5, the antenna icon 600 may be blinked slowly in an orange color. Similarly, for the "CONNECTION REQUEST" state 506, the antenna icon 600 may be blinked in an orange color. Both of these indications provide feedback to the user in an intuitive manner regarding the power-up sequencing of the wireless display device 102. Though the present examples indicate color variations, it should be noted that certain colors may be imperceptible by certain individuals. As such, variations in display rate (e.g., blink rate), static icon display, or other display variations may be used to address such a situation.

FIG. 7 is a drawing of an example of an implementation of the visual icon pair of FIG. 6 modified to represent that no signaling is being received from a partner local wireless media transmission device, such as the local media box 108. As can be seen from FIG. 7, a no-signal icon 604 represented as a letter "X" is displayed over the antenna icon 600. As can be seen from TABLE 1, the no-signal icon 604 may be displayed in a solid red color to represent that no signal is being received from the local media box 108, such as identified via the "NO PARTNER" state 510 of FIG. 5. In this manner, the wireless display device 102 provides real-time feedback of a lack of reception of signaling to assist the user with correction of signaling issues within the system 100. Further, the feedback provided by the wireless display device 102 provides the user with feedback that the wireless display device 102 is functional to provide the iconic information.

FIG. 8 is a drawing of an example of an implementation of the visual icon pair of FIG. 6 modified to represent that a connection difficulty or lost signaling has been identified by the wireless display device 102. As can be seen from FIG. 8, a hand icon 606 is displayed over the antenna icon 600. As can be seen from TABLE 1, the hand icon 604 may be blinked in an red color to represent that a signal from the local media box 108 has been lost or that a connection difficulty has been identified, such as identified via the "CONNECTION DIFFICULTY/SIGNAL LOST" state 516 of FIG. 5. In this manner, the wireless display device 102 provides real-time feedback of lost signaling or a connection difficulty to assist the user with correction of signaling issues within the system 100. Further, the feedback provided by the wireless display device 102 provides the user with feedback that the wireless display device 102 is functional to provide the iconic information.

FIG. 9 is a drawing of an example of an implementation of the visual icon pair of FIG. 6 modified to represent that the wireless display device 102 is connecting with the local media box 108. As can be seen from FIG. 9, three of the indicators within the signal strength icon array 602 are darkened to indicate that signaling is present and that the wireless display device 102 is in the process of connecting with the local media box 108. Signal strength changes for illumination of each successive one of the signal strength icon array 602 may be based upon any suitable measure appropriate for a given implementation. For example, a five percent (5%), a ten percent (10%), or other percentage, difference may be used for illumination of each successive one of the signal strength icon array 602.

As can be seen from TABLE 1, indicators within the signal strength icon array 602 may be blinked in an green color to represent that a the wireless display device 102 is responding to a connection request, such as identified via the "CONNECTING" state 512 of FIG. 5. In this manner, the wireless display device 102 provides real-time feedback of the attempt to connect with the local media box 108 to assist the user with correction of signaling issues within the system 100. Further, the feedback provided by the wireless display device 102 provides the user with feedback that the wireless display device 102 is functional to provide the iconic information.

Figure 10:
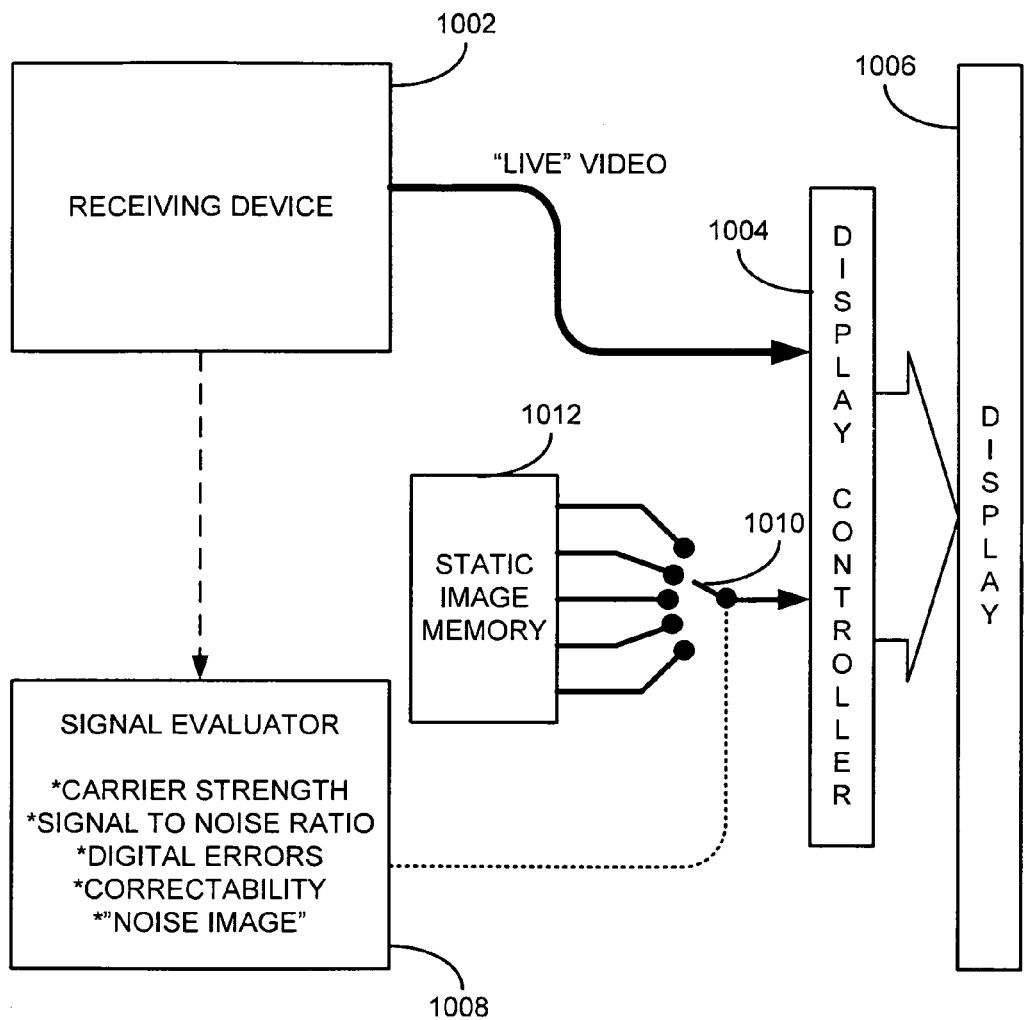
FIG. 10 is a block diagram of an example of an implementation of an alternative wireless display device for wireless link status presentation for wireless displays consistent with certain embodiments of the present invention.

FIG. 10 is a block diagram of an example of an implementation of an alternative wireless display device 1000 for wireless link status presentation for wireless displays. Within FIG. 10, a receiving device 1002 may receive content from a local wireless media transmission device, such as the local media box 108. Live video content is passed from the receiving device 1002 to a display controller 1004. The display controller 1004 passes video content to a display 1006 for presentation to a viewer.

A signal evaluator module 1008 evaluates signaling received via the receiving device 1002. The received signaling may be evaluated for carrier strength, signal to noise ratio, digital errors, correctability, and for variations in an expected/anticipated "noise image." Based upon the evaluation of the received signaling, the signal evaluator module 1008 may control a switch 1010 for selection of static images from a static image memory 1012. It is understood that the switch 1010 may be implemented in a variety of ways and is shown symbolically for ease of description purposes.

As such, the example wireless display device 1000 may selectively choose static display images from a memory, such as the static image memory 1012 for display via the display 1006. These static images may be changed periodically, aperiodically, randomly, or otherwise to convey status to a viewer. Further, a setting for the switch 1010 may include display of no static image. As such, the switch 1010 may be toggled between displaying a static image and displaying no image to blink a static icon for display of status, as described above. Many other variations on the example wireless display device 1000 are possible and all are considered within the scope of the present subject matter.

Based upon the foregoing description, the present subject matter provides for wireless link status presentation for wireless displays. A wireless display device located proximate to a local wireless media transmission device performs autonomous processing to identify and help a user correct wireless signaling reception problems, such as obstructions and partial obstructions. The wireless display device detects a deviation from an expected wireless link status between the wireless display device and the local wireless media transmission device. The wireless display device determines, based upon the detected deviation from the expected wireless link status, that an expected wireless signal is not incident upon a first wireless receiver of the wireless display device. The wireless display device identifies a problem that causes the detected deviation from the expected wireless link status. The wireless display device displays a wireless status indicator via the wireless display device indicating that the expected wireless signal is not incident upon the first wireless receiver and indicating the identified problem that causes the detected deviation from the expected wireless link status. Accordingly, the wireless display device provides a user with detailed information regarding problems associated with wireless signaling reception and suggestions for correcting the identified problems.

Thus, in accord with certain implementations, a method of displaying status for a wireless link between a wireless display device and a local wireless media transmission device involves detecting, via the wireless display device, a deviation from an expected wireless link status between the wireless display device and the local wireless media transmission device, where the local wireless media transmission device is located proximate to the wireless display device; determining, based upon the detected deviation from the expected wireless link status, that an expected wireless signal is not incident upon a first wireless receiver of the wireless display device; identifying a problem that causes the detected deviation from the expected wireless link status; and displaying a wireless status indicator via a display associated with the wireless display device, where the wireless status indicator indicates that the expected wireless signal is not incident upon the first wireless receiver and indicates the identified problem that causes the detected deviation from the expected wireless link status.

In certain implementations, the first wireless receiver comprises a directional wireless receiver and the method of determining, based upon the detected deviation from the expected wireless link status, that the expected wireless signal is not incident upon the first wireless receiver of the wireless display device involves comparing a signal received from the directional wireless receiver with the expected wireless signal. In certain implementations, the method of determining, based upon the detected deviation from the expected wireless link status, that the expected wireless signal is not incident upon the first wireless receiver of the wireless display device involves determining an insufficient wireless signal is present at the first wireless receiver. In certain implementations, the method of identifying the problem that causes the detected deviation from the expected wireless link status involves identifying that an obstruction placed between the local wireless media transmission device and the wireless display device causes an absence of the expected wireless signal at the first wireless receiver of the wireless display device; and the method of displaying the wireless status indicator via the display involves displaying an indication that the insufficient wireless signal is present at the first wireless receiver and an indication that the obstruction is located between the local wireless media transmission device and the wireless display device. In certain implementations, the method of displaying the wireless status indicator via the display involves displaying an instruction directing a user to move the obstruction. In certain implementations, the method of displaying the wireless status indicator via the display involves displaying an instruction directing a user to move the local wireless media transmission device to reflect a transmitted signal generated by the local wireless media transmission device off of at least one of a ceiling and a wall of a room within which the local wireless media transmission device and the wireless display device are located. In certain implementations, the method of determining, based upon the detected deviation from the expected wireless link status, that the expected wireless signal is not incident upon the first wireless receiver of the wireless display device involves determining an absence of the expected wireless signal at the first wireless receiver. In certain implementations, the method of identifying the problem that causes the detected deviation from the expected wireless link status involves identifying that a power-off condition at the local wireless media transmission device causes the absence of the expected wireless signal at the first wireless receiver of the wireless display device; and the method of displaying the wireless status indicator via the display involves displaying an indication of the absence of the expected wireless signal at the first wireless receiver and an indication that the power-off condition at the local wireless media transmission device causes the absence of the expected wireless signal at the first wireless receiver. In certain implementations, the method of identifying the problem that causes the detected deviation from the expected wireless link status involves identifying a plurality of problems that cause the detected deviation from the expected wireless link status; and the method of displaying the wireless status indicator via the display involves displaying the identified plurality of problems that cause the detected deviation from the expected wireless link status and an instruction directing a user to correct a first one of the identified plurality of problems. In certain implementations, the method further involves detecting an indication via an input device that the user has corrected the first one of the identified plurality of problems; and determining whether the expected wireless signal is incident upon the first wireless receiver. In certain implementations, the method further involves, upon detecting the indication that the user has corrected the first one of the identified plurality of problems and upon determining that the expected wireless signal is not incident upon the first wireless receiver, displaying an instruction via the display directing the user to correct a second one of the identified plurality of problems. In certain implementations, the method further involves detecting an indication via the input device that the user has corrected the second one of the identified plurality of problems; determining that the expected wireless signal is incident upon the first wireless receiver of the wireless display device; and displaying an indication via the display that the expected wireless signal is incident upon the first wireless receiver. In certain implementations, the first wireless receiver comprises a directional wireless receiver tuned to a directional frequency, and the method further involves detecting signaling transmitted from the local wireless media transmission device via a second omni-directional wireless receiver tuned to an omni-directional frequency; and the method of identifying the problem that causes the detected deviation from the expected wireless link status involves identifying that an obstruction placed between the local wireless media transmission device and the wireless display device causes an absence of the expected wireless signal at the first directional wireless receiver in conjunction with detection of the signaling transmitted from the local wireless media transmission device via the second omni-directional wireless receiver. In certain implementations, the directional frequency comprises sixty gigahertz (60 GHz) and the omni-directional frequency comprises two and four tenths gigahertz (2.4 GHz). In certain implementations, the method of determining, based upon the detected deviation from the expected wireless link status, that the expected wireless signal is not incident upon the first wireless receiver comprises: determining that a signal of quality lower than the expected wireless signal is incident upon the first wireless receiver; performing image analysis of video content within the lower-quality signal; and determining, based upon the image analysis of the video content, whether the local wireless media transmission device is providing useable video content. In certain implementations, the method further involves identifying a static iconic display image generated by the local wireless media transmission device in response to the performed image analysis of the video content within the lower-quality signal; determining that the static iconic display image is a logo associated with the local wireless media transmission device; and displaying an indication via the display that the local wireless media transmission device is functional. In certain implementations, the method further involves identifying a static display image generated by the local wireless media transmission device in response to the performed image analysis of the video content within the lower-quality signal; and the method of identifying the problem that causes the detected deviation from the expected wireless link status involves: determining that the local wireless media transmission device is functional; and identifying that a partial obstruction placed between the local wireless media transmission device and the wireless display device causes the static display image generated by the local wireless media transmission device to be present within the lower-quality signal incident upon the first wireless receiver. In certain implementations, the method further involves generating an audible indication via an audio output device indicating that the expected wireless signal is not incident upon the first wireless receiver and the identified problem that causes the detected deviation from the expected wireless link status. In certain implementations, the method further involves detecting a request, via an input device, to enter a troubleshooting mode for the wireless display device; entering the troubleshooting mode for the wireless display device; and providing instructions to a user via an audio output device for troubleshooting the problem that causes the detected deviation from the expected wireless link status. In certain implementations, the method further involves automatically performing an internal diagnostic sequence via the wireless display device; and displaying, upon determining that the wireless display device passed the internal diagnostic sequence, an indication via the display that the wireless display device is functioning properly.

In another implementation, a computer readable storage medium may store instructions which, when executed on one or more programmed processors, carry out a process of detecting, via the wireless display device, a deviation from an expected wireless link status between the wireless display device and the local wireless media transmission device, where the local wireless media transmission device is located proximate to the wireless display device; determining, based upon the detected deviation from the expected wireless link status, that an expected wireless signal is not incident upon a first wireless receiver of the wireless display device; identifying a problem that causes the detected deviation from the expected wireless link status; and displaying a wireless status indicator via a display associated with the wireless display device, where the wireless status indicator indicates that the expected wireless signal is not incident upon the first wireless receiver and indicates the identified problem that causes the detected deviation from the expected wireless link status.

A wireless display device, consistent with certain implementations has a display comprising a display area; a first wireless receiver device that receives video content that is displayed via the display; and a processor configured to: detect a deviation from an expected wireless link status between the wireless display device and a local wireless media transmission device, where the local wireless media transmission device is located proximate to the wireless display device; determine, based upon the detected deviation from the expected wireless link status, that an expected wireless signal is not incident upon the first wireless receiver of the wireless display device; identify a problem that causes the detected deviation from the expected wireless link status; and display a wireless status indicator via the display, where the wireless status indicator indicates that the expected wireless signal is not incident upon the first wireless receiver and indicates the identified problem that causes the detected deviation from the expected wireless link status.

In certain implementations, the first wireless receiver comprises a directional wireless receiver and the processor, in being configured to determine, based upon the detected deviation from the expected wireless link status, that the expected wireless signal is not incident upon the first wireless receiver of the wireless display device, is further configured to compare a signal received from the directional wireless receiver with the expected wireless signal. In certain implementations, the processor, in being configured to determine, based upon the detected deviation from the expected wireless link status, that the expected wireless signal is not incident upon the first wireless receiver of the wireless display device, is configured to determine an insufficient wireless signal is present at the first wireless receiver. In certain implementations, the processor, in being configured to identify the problem that causes the detected deviation from the expected wireless link status, is configured to identify that an obstruction placed between the local wireless media transmission device and the wireless display device causes an absence of the expected wireless signal at the first wireless receiver of the wireless display device; and the processor, in being configured to display the wireless status indicator via the display, is configured to display an indication that the insufficient wireless signal is present at the first wireless receiver and an indication that the obstruction is located between the local wireless media transmission device and the wireless display device. In certain implementations, the processor, in being configured to display the wireless status indicator via the display, is configured to display an instruction directing a user to move the obstruction. In certain implementations, the processor, in being configured to display the wireless status indicator via the display, is configured to display an instruction directing a user to move the local wireless media transmission device to reflect a transmitted signal generated by the local wireless media transmission device off of at least one of a ceiling and a wall of a room within which the local wireless media transmission device and the wireless display device are located. In certain implementations, the processor, in being configured to determine, based upon the detected deviation from the expected wireless link status, that the expected wireless signal is not incident upon the first wireless receiver of the wireless display device, is configured to determine an absence of the expected wireless signal at the first wireless receiver. In certain implementations, the processor, in being configured to identify the problem that causes the detected deviation from the expected wireless link status, is configured to identify that a power-off condition at the local wireless media transmission device causes the absence of the expected wireless signal at the first wireless receiver of the wireless display device; and the processor, in being configured to display the wireless status indicator via the display, is configured to display an indication of the absence of the expected wireless signal at the first wireless receiver and an indication that the power-off condition at the local wireless media transmission device causes the absence of the expected wireless signal at the first wireless receiver. In certain implementations, the processor, in being configured to identify the problem that causes the detected deviation from the expected wireless link status, is configured to identify a plurality of problems that cause the detected deviation from the expected wireless link status; and in being configured to display the wireless status indicator via the display, is configured to display the identified plurality of problems that cause the detected deviation from the expected wireless link status and an instruction directing a user to correct a first one of the identified plurality of problems. In certain implementations, wireless display device further has an input device; and the processor is further configured to: detect an indication via the input device that the user has corrected the first one of the identified plurality of problems; and determine whether the expected wireless signal is incident upon the first wireless receiver. In certain implementations, upon detecting the indication that the user has corrected the first one of the identified plurality of problems and upon determining that the expected wireless signal is not incident upon the first wireless receiver, the processor is further configured to display an instruction via the display directing the user to correct a second one of the identified plurality of problems. In certain implementations, the processor is further configured to: detect an indication via the input device that the user has corrected the second one of the identified plurality of problems; determine that the expected wireless signal is incident upon the first wireless receiver of the wireless display device; and display an indication via the display that the expected wireless signal is incident upon the first wireless receiver. In certain implementations, the first wireless receiver comprises a directional wireless receiver tuned to a directional frequency; and the wireless display device has a second omni-directional wireless receiver tuned to an omni-directional frequency; and the processor is further configured to detect signaling transmitted from the local wireless media transmission device via the second omni-directional wireless receiver; and, the processor, in being configured to identify the problem that causes the detected deviation from the expected wireless link status, is configured to identify that an obstruction placed between the local wireless media transmission device and the wireless display device causes an absence of the expected wireless signal at the first directional wireless receiver in conjunction with detection of the signaling transmitted from the local wireless media transmission device via the second omni-directional wireless receiver. In certain implementations, the directional frequency comprises sixty gigahertz (60 GHz) and the omni-directional frequency comprises two and four tenths gigahertz (2.4 GHz). In certain implementations, the processor, in being configured to determine, based upon the detected deviation from the expected wireless link status, that the expected wireless signal is not incident upon the first wireless receiver, is configured to: determine that a signal of quality lower than the expected wireless signal is incident upon the first wireless receiver; perform image analysis of video content within the lower-quality signal; and determine, based upon the image analysis of the video content, whether the local wireless media transmission device is providing useable video content. In certain implementations, the processor is further configured to: identify a static iconic display image generated by the local wireless media transmission device in response to the performed image analysis of the video content within the lower-quality signal; determine that the static iconic display image is a logo associated with the local wireless media transmission device; and display an indication via the display that the local wireless media transmission device is functional. In certain implementations, the processor is further configured to: identify a static display image generated by the local wireless media transmission device in response to the performed image analysis of the video content within the lower-quality signal; and the processor, in being configured to identify the problem that causes the detected deviation from the expected wireless link status, is configured to: determine that the local wireless media transmission device is functional; and identify that a partial obstruction placed between the local wireless media transmission device and the wireless display device causes the static display image generated by the local wireless media transmission device to be present within the lower-quality signal incident upon the first wireless receiver. In certain implementations, wireless display device has an audio output device; and the processor is further configured to generate an audible indication via the audio output device indicating that the expected wireless signal is not incident upon the first wireless receiver and the identified problem that causes the detected deviation from the expected wireless link status. In certain implementations, wireless display device has an input device; an audio output device; and the processor is further configured to: detect a request, via the input device, to enter a troubleshooting mode for the wireless display device; enter the troubleshooting mode for the wireless display device; and provide instructions to a user via an audio output device for troubleshooting the problem that causes the detected deviation from the expected wireless link status. In certain implementations, the processor is further configured to: automatically perform an internal diagnostic sequence via the wireless display device; and display, upon determining that the wireless display device passed the internal diagnostic sequence, an indication via the display that the wireless display device is functioning properly.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of displaying status for a wireless link between a wireless display device and a local wireless media transmission device, comprising:
    detecting, via the wireless display device, a deviation from an expected wireless link status between the wireless display device and the local wireless media transmission device, where the local wireless media transmission device is located proximate to the wireless display device;
    determining, based upon the detected deviation from the expected wireless link status, that an expected wireless signal is not incident upon a first wireless receiver of the wireless display device by determining that an insufficient wireless signal is present at the first wireless receiver;
    identifying at least one problem that causes the detected deviation from the expected wireless link status by identifying that an obstruction placed between the local wireless media transmission device and the wireless display device causes an absence of the expected wireless signal at the first wireless receiver of the wireless display device; and
    displaying a wireless status indicator via a display associated with the wireless display device, where the wireless status indicator indicates that the expected wireless signal is not incident upon the first wireless receiver and indicates the identified problem that causes the detected deviation from the expected wireless link status, and where displaying the wireless status indicator via the display comprises displaying an indication that the insufficient wireless signal is present at the first wireless receiver and an indication that the obstruction is located between the local wireless media transmission device and the wireless display device.

2. The method according to claim 1, where the first wireless receiver comprises a directional wireless receiver and where determining, based upon the detected deviation from the expected wireless link status, that the expected wireless signal is not incident upon the first wireless receiver of the wireless display device comprises comparing a signal received from the directional wireless receiver with the expected wireless signal.

3. The method according to claim 1, where displaying the wireless status indicator via the display comprises displaying an instruction directing a user to move the obstruction.

4. The method according to claim 1, where displaying the wireless status indicator via the display comprises displaying an instruction directing a user to move the local wireless media transmission device to reflect a transmitted signal generated by the local wireless media transmission device off of at least one of a ceiling and a wall of a room within which the local wireless media transmission device and the wireless display device are located.

5. The method according to claim 1, where determining, based upon the detected deviation from the expected wireless link status, that the expected wireless signal is not incident upon the first wireless receiver of the wireless display device comprises determining an absence of the expected wireless signal at the first wireless receiver.

6. The method according to claim 5, where:
identifying at least one problem that causes the detected deviation from the expected wireless link status comprises identifying that a power-off condition at the local wireless media transmission device causes the absence of the expected wireless signal at the first wireless receiver of the wireless display device; and
displaying the wireless status indicator via the display comprises displaying an indication of the absence of the expected wireless signal at the first wireless receiver and an indication that the power-off condition at the local wireless media transmission device causes the absence of the expected wireless signal at the first wireless receiver.

7. The method according to claim 1, where the first wireless receiver comprises a directional wireless receiver tuned to a directional frequency and further comprising:
detecting signaling transmitted from the local wireless media transmission device via a second omni-directional wireless receiver tuned to an omni-directional frequency; and
where identifying the problem that causes the detected deviation from the expected wireless link status comprises identifying that an obstruction placed between the local wireless media transmission device and the wireless display device causes an absence of the expected wireless signal at the first directional wireless receiver in conjunction with detection of the signaling transmitted from the local wireless media transmission device via the second omni-directional wireless receiver.

8. The method according to claim 7, where the directional frequency comprises sixty gigahertz (60 GHz) and the omni-directional frequency comprises two and four tenths gigahertz (2.4 GHz).

9. The method according to claim 1, where determining, based upon the detected deviation from the expected wireless link status, that the expected wireless signal is not incident upon the first wireless receiver comprises:
determining that a signal of quality lower than the expected wireless signal is incident upon the first wireless receiver;
performing image analysis of video content within the lower-quality signal; and
determining, based upon the image analysis of the video content, whether the local wireless media transmission device is providing useable video content.

10. The method according to claim 9, further comprising:
identifying a static iconic display image generated by the local wireless media transmission device in response to the performed image analysis of the video content within the lower-quality signal;
determining that the static iconic display image is a logo associated with the local wireless media transmission device; and
displaying an indication via the display that the local wireless media transmission device is functional.

11. The method according to claim 9, further comprising:
identifying a static display image generated by the local wireless media transmission device in response to the performed image analysis of the video content within the lower-quality signal; and
where identifying the problem that causes the detected deviation from the expected wireless link status comprises:
determining that the local wireless media transmission device is functional; and
identifying that a partial obstruction placed between the local wireless media transmission device and the wireless display device causes the static display image generated by the local wireless media transmission device to be present within the lower-quality signal incident upon the first wireless receiver.

12. The method according to claim 1, further comprising generating an audible indication via an audio output device indicating that the expected wireless signal is not incident upon the first wireless receiver and the identified problem that causes the detected deviation from the expected wireless link status.

13. The method according to claim 1, further comprising:
detecting a request, via an input device, to enter a troubleshooting mode for the wireless display device;
entering the troubleshooting mode for the wireless display device; and
providing instructions to a user via an audio output device for troubleshooting the problem that causes the detected deviation from the expected wireless link status.

14. The method according to claim 1, further comprising:
automatically performing an internal diagnostic sequence via the wireless display device; and
displaying, upon determining that the wireless display device passed the internal diagnostic sequence, an indication via the display that the wireless display device is functioning properly.

15. A computer readable storage medium storing instructions which, when executed on one or more programmed processors, carry out a process according to claim 1.

16. A method of displaying status for a wireless link between a wireless display device and a local wireless media transmission device, comprising:
detecting, via the wireless display device, a deviation from an expected wireless link status between the wireless display device and the local wireless media transmission device, where the local wireless media transmission device is located proximate to the wireless display device;
determining, based upon the detected deviation from the expected wireless link status, that an expected wireless signal is not incident upon a first wireless receiver of the wireless display device;
identifying a plurality of problems that cause the detected deviation from the expected wireless link status; and
displaying a wireless status indicator via a display associated with the wireless display device, where the wireless status indicator indicates that the expected wireless signal is not incident upon the first wireless receiver and indicates the identified plurality of problems that cause the detected deviation from the expected wireless link status, where displaying the identified plurality of problems that cause the detected deviation from the expected wireless link status includes displaying an instruction directing a user to correct a first one of the identified plurality of problems.

17. The method according to claim 16, further comprising:
detecting an indication via an input device that the user has corrected the first one of the identified plurality of problems; and
determining whether the expected wireless signal is incident upon the first wireless receiver.

18. The method according to claim 17, where, upon detecting the indication that the user has corrected the first one of the identified plurality of problems and upon determining that the expected wireless signal is not incident upon the first wireless receiver, displaying an instruction via the display directing the user to correct a second one of the identified plurality of problems.

19. The method according to claim 18, further comprising:
detecting an indication via the input device that the user has corrected the second one of the identified plurality of problems;
determining that the expected wireless signal is incident upon the first wireless receiver of the wireless display device; and
displaying an indication via the display that the expected wireless signal is incident upon the first wireless receiver.

20. A wireless display device, comprising: a display comprising a display area; a first wireless receiver device that receives video content that is displayed via the display; and a processor configured to: detect a deviation from an expected wireless link status between the wireless display device and a local wireless media transmission device, where the local wireless media transmission device is located proximate to the wireless display device; determine, based upon the detected deviation from the expected wireless link status, that an expected wireless signal is not incident upon the first wireless receiver of the wireless display device by determining that an insufficient wireless signal is present at the first wireless receiver; identify at least one problem that causes the detected deviation from the expected wireless link status; and display a wireless status indicator via the display, where the wireless status indicator indicates that the expected wireless signal is not incident upon the first wireless receiver and indicates the identified problem that causes the detected deviation from the expected wireless link status, where the processor is configured to display an indication that the insufficient wireless signal is present at the first wireless receiver and an indication that an obstruction is located between the local wireless media transmission device and the wireless display device.

21. The wireless display device according to claim 20, where the first wireless receiver comprises a directional wireless receiver and where, in being configured to determine, based upon the detected deviation from the expected wireless link status, that the expected wireless signal is not incident upon the first wireless receiver of the wireless display device, the processor is configured to compare a signal received from the directional wireless receiver with the expected wireless signal.

22. The wireless display device according to claim 20, where, in being configured to display the wireless status indicator via the display, the processor is configured to display an instruction directing a user to move the obstruction.

23. The wireless display device according to claim 20, where, in being configured to display the wireless status indicator via the display, the processor is configured to display an instruction directing a user to move the local wireless media transmission device to reflect a transmitted signal generated by the local wireless media transmission device off of at least one of a ceiling and a wall of a room within which the local wireless media transmission device and the wireless display device are located.

24. The wireless display device according to claim 20, where, in being configured to determine, based upon the detected deviation from the expected wireless link status, that the expected wireless signal is not incident upon the first wireless receiver of the wireless display device, the processor is configured to determine an absence of the expected wireless signal at the first wireless receiver.

25. The wireless display device according to claim 24, where:
in being configured to identify the problem that causes the detected deviation from the expected wireless link status, the processor is configured to identify that a power-off condition at the local wireless media transmission device causes the absence of the expected wireless signal at the first wireless receiver of the wireless display device; and
in being configured to display the wireless status indicator via the display, the processor is configured to display an indication of the absence of the expected wireless signal at the first wireless receiver and an indication that the power-off condition at the local wireless media transmission device causes the absence of the expected wireless signal at the first wireless receiver.

26. The wireless display device according to claim 20, where the first wireless receiver comprises a directional wireless receiver tuned to a directional frequency and further comprising:
a second omni-directional wireless receiver tuned to an omni-directional frequency; and
where the processor is further configured to:
detect signaling transmitted from the local wireless media transmission device via the second omni-directional wireless receiver; and
where, in being configured to identify the problem that causes the detected deviation from the expected wireless link status, the processor is configured to identify that an obstruction placed between the local wireless media transmission device and the wireless display device causes an absence of the expected wireless signal at the first directional wireless receiver in conjunction with detection of the signaling transmitted from the local wireless media transmission device via the second omni-directional wireless receiver.

27. The wireless display device according to claim 26, where the directional frequency comprises sixty gigahertz (60 GHz) and the omni-directional frequency comprises two and four tenths gigahertz (2.4 GHz).

28. The wireless display device according to claim 20, where, in being configured to determine, based upon the detected deviation from the expected wireless link status, that the expected wireless signal is not incident upon the first wireless receiver, the processor is configured to:
determine that a signal of quality lower than the expected wireless signal is incident upon the first wireless receiver;
perform image analysis of video content within the lower-quality signal; and determine, based upon the image analysis of the video content, whether the local wireless media transmission device is providing useable video content.

29. The wireless display device according to claim 22, where the processor is further configured to:
- identify a static iconic display image generated by the local wireless media transmission device in response to the performed image analysis of the video content within the lower-quality signal;
- determine that the static iconic display image is a logo associated with the local wireless media transmission device; and
- display an indication via the display that the local wireless media transmission device is functional.

30. The wireless display device according to claim 28, where the processor is further configured to:
- identify a static display image generated by the local wireless media transmission device in response to the performed image analysis of the video content within the lower-quality signal; and
- where, in being configured to identify the problem that causes the detected deviation from the expected wireless link status, the processor is configured to:
  - determine that the local wireless media transmission device is functional; and
  - identify that a partial obstruction placed between the local wireless media transmission device and the wireless display device causes the static display image generated by the local wireless media transmission device to be present within the lower-quality signal incident upon the first wireless receiver.

31. The wireless display device according to claim 20, further comprising:
- an audio output device; and
- where the processor is further configured to generate an audible indication via the audio output device indicating that the expected wireless signal is not incident upon the first wireless receiver and the identified problem that causes the detected deviation from the expected wireless link status.

32. The wireless display device according to claim 20, further comprising:
- an input device;
- an audio output device; and
- where the processor is further configured to:
  - detect a request, via the input device, to enter a troubleshooting mode for the wireless display device;
  - enter the troubleshooting mode for the wireless display device; and
  - provide instructions to a user via an audio output device for troubleshooting the problem that causes the detected deviation from the expected wireless link status.

33. The wireless display device according to claim 20, where the processor is further configured to:
- automatically perform an internal diagnostic sequence via the wireless display device; and
- display, upon determining that the wireless display device passed the internal diagnostic sequence, an indication via the display that the wireless display device is functioning properly.

34. A wireless display device, comprising: a display comprising a display area; a first wireless receiver device that receives video content that is displayed via the display; and a processor configured to: detect a deviation from an expected wireless link status between the wireless display device and a local wireless media transmission device, where the local wireless media transmission device is located proximate to the wireless display device; determine, based upon the detected deviation from the expected wireless link status, that an expected wireless signal is not incident upon the first wireless receiver of the wireless display device; identify at least one problem that causes the detected deviation from the expected wireless link status; and display a wireless status indicator via the display, where the wireless status indicator indicates that the expected wireless signal is not incident upon the first wireless receiver and indicates the identified problem that causes the detected deviation from the expected wireless link status; and in being configured to identify the problem that causes the detected deviation from the expected wireless link status, the processor is configured to identify a plurality of problems that cause the detected deviation from the expected wireless link status; and in being configured to display the wireless status indicator via the display, the processor is configured to display the identified plurality of problems that cause the detected deviation from the expected wireless link status and an instruction directing a user to correct a first one of the identified plurality of problems.

35. The wireless display device according to claim 34, further comprising:
- an input device; and
- where the processor is further configured to:
  - detect an indication via the input device that the user has corrected the first one of the identified plurality of problems; and
  - determine whether the expected wireless signal is incident upon the first wireless receiver.

36. The wireless display device according to claim 35, where, upon detecting the indication that the user has corrected the first one of the identified plurality of problems and upon determining that the expected wireless signal is not incident upon the first wireless receiver, the processor is further configured to display an instruction via the display directing the user to correct a second one of the identified plurality of problems.

37. The wireless display device according to claim 36, where the processor is further configured to:
- detect an indication via the input device that the user has corrected the second one of the identified plurality of problems;
- determine that the expected wireless signal is incident upon the first wireless receiver of the wireless display device; and
- display an indication via the display that the expected wireless signal is incident upon the first wireless receiver.

* * * * *